United States Patent
Frend

(10) Patent No.: US 11,090,560 B2
(45) Date of Patent: Aug. 17, 2021

(54) PHYSICAL DEVICE INTERFACE FOR VIRTUAL REALITY SYSTEM

(71) Applicant: Indiana University Research and Technology Corporation, Indianapolis, IN (US)

(72) Inventor: Chauncey Eugene Frend, Greenwood, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 391 days.

(21) Appl. No.: 16/076,297

(22) PCT Filed: Feb. 16, 2017

(86) PCT No.: PCT/US2017/018095
§ 371 (c)(1),
(2) Date: Aug. 7, 2018

(87) PCT Pub. No.: WO2017/143012
PCT Pub. Date: Aug. 24, 2017

(65) Prior Publication Data
US 2021/0031102 A1 Feb. 4, 2021

Related U.S. Application Data

(60) Provisional application No. 62/295,698, filed on Feb. 16, 2016.

(51) Int. Cl.
*A63F 13/28* (2014.01)
*A63F 13/98* (2014.01)

(52) U.S. Cl.
CPC .............. *A63F 13/28* (2014.09); *A63F 13/98* (2014.09); *A63F 2300/1031* (2013.01); *A63F 2300/302* (2013.01); *A63F 2300/8082* (2013.01)

(58) Field of Classification Search
CPC .... A63F 13/28; A63F 13/98; A63F 2300/302; A63F 2300/8082
See application file for complete search history.

(56) References Cited

U.S. PATENT DOCUMENTS 6,226,669 B1 5/2001 Huang et al.
8,902,159 B1 12/2014 Matthews et al.
(Continued)

OTHER PUBLICATIONS

International Search Report and Written Opinion issued by the ISA/US, Commissioner for Patents, dated May 3, 2017, for International Application No. PCT/US2017/018095; 11 pages.

*Primary Examiner* — James S. McClellan
(74) *Attorney, Agent, or Firm* — Faegre Drinker Biddle & Reath LLP

(57) ABSTRACT

A physical device interface for a virtual reality system is provided, comprising: a microprocessor board including a microprocessor, a plurality of control outputs, a first communication port and a second communication port; a plurality of receptacles configured to provide power to a corresponding plurality of physical devices; and a power board coupled to the plurality of control outputs and the plurality of receptacles, the power board including a plurality of channels controlled by the plurality of control outputs to provide power to the plurality of receptacles. The first communication port is configured to communicate with a computer for configuration of the interface and the second communication port is configured to communicate with another interface.

20 Claims, 20 Drawing Sheets

(56) References Cited

U.S. PATENT DOCUMENTS

| | | | |
|---|---|---|---|
| 2007/0123390 A1* | 5/2007 | Mathis | A63F 13/06 482/8 |
| 2013/0044128 A1 | 2/2013 | Liu et al. | |
| 2013/0083003 A1 | 4/2013 | Perez et al. | |
| 2014/0005809 A1* | 1/2014 | Frei | G06F 13/10 700/90 |
| 2014/0045532 A1 | 2/2014 | Fraccaroli | |
| 2015/0346722 A1* | 12/2015 | Herz | G05D 1/0027 701/2 |
| 2016/0026253 A1 | 1/2016 | Bradski et al. | |

\* cited by examiner

PHYSICAL DEVICE INTERFACE FOR VIRTUAL REALITY SYSTEM

CROSS-REFERENCE TO RELATED APPLICATIONS

The present application is a U.S. national stage filing of PCT/US2017/018095, filed on Feb. 16, 2017, which claims priority from U.S. Provisional Application No. 62/295,698, entitled "PHYSICAL DEVICE INTERFACE FOR VIRTUAL REALITY SYSTEM," filed on Feb. 16, 2016, the entire contents each of which is expressly incorporated herein by reference in its entirety.

FIELD OF THE DISCLOSURE

This disclosure relates to systems and methods for interfacing physical devices to virtual reality systems and more specifically, to modular, scalable switch controllers or interfaces that connect virtual reality software systems to environmental feedback devices that augment virtual environments.

BACKGROUND

Virtual reality ("VR") systems are known, and typically present to a user a computer-simulated virtual environment ("VE") that simulates an actual physical location or an imaginary location. Typically, the VE is displayed on one or more displays (e.g., stereoscopic displays), which may be included in a headset worn by the user. In many such systems, the user can navigate the VE using one or more input devices to encounter different locations and situations.

Some VR systems provide additional sensory feedback (i.e., beyond visual feedback) designed to make the VR experience more immersive. In addition to audio information corresponding to the VE, some such systems provide tactile and olfactory feedback. Environmental feedback devices ("EFDs") such as fans, heaters, motion and/or vibration generators may be coupled to the VR system to artificially create a more immersive sensory experience.

An often referenced early example of an EFD control system is the Sensorama Simulator created and patented by Morton Heilig in the 1960s. This apparatus presented a wide array of environmental feedback including wind, vibration, and olfactory scents presented in parallel to a stereoscopic film. Heilig's progressive design proposed the incorporation of EFDs into an immersive system. Portions of this design have been referenced, duplicated, and studied within the domain of VR research. All of these studies seek useful results related to improving user experiences within VEs.

FIG. 1 provides a conventional model for controlling EFDs in a VR system. An environmental event is sensed within the VE software 10 and communicated through some electronic control device 12, and ultimately rendered by the EFD 14. In one such system, controls 115 volt ADDA Axialfans and Infrared lamps using a MultiDim MKIII Dimmerpack. The event communication is completed by serial DMX-protocol. The combination of the MultiDim system and DMXprotocol is a common control configuration within the theater and lighting industry.

In another system, vr scooter users were passively monitored for environmental events within the VE, such as wind speed or vibrotactile cues, events were sent to a Relay Controller and Input Status Interface box. This box contains an electronic relay control board and an input status interface board. These circuit boards are the AR-16 Relay Interface and the STA-16 Status Input Interface both available from Electronic Energy Controls Inc. The protocol used for event communication was RS-232. This electronic control approach using the AR-16 and STA-16 devices is a common practice within the home energy automation industry.

Such conventional methods for controlling EFDs in a VR system are not easily expanded to incorporate other EFDs. Conventional systems are typically hard-wired, with the EFDs being directly controlled by the VR software controller, or controlled through a custom control circuit having dedicated EFD outputs. Moreover, conventional VR systems including EFDs make software configuration difficult for the VE developer as development tools are not provided.

A need therefore exists for a modular, expandable interface between EFDs and VR software that provides tools for the VE development environment.

SUMMARY

In one embodiment, a physical device interface for a virtual reality system is provided, comprising: a microprocessor board including a microprocessor, a plurality of control outputs, a first communication port and a second communication port; a plurality of receptacles configured to provide power to a corresponding first plurality of environmental feedback devices; and a power board coupled to the plurality of control outputs and the plurality of receptacles, the power board including a plurality of channels controlled by the plurality of control outputs to provide power to the plurality of receptacles; wherein the first communication port is configured to communicate with a computer for configuration of the interface and the second communication port is configured to communicate with at least one other physical device interface. In one aspect of this embodiment, the first communication port is an Ethernet port. In another aspect, the second communication port is a USB port. In still another aspect, the microprocessor is configured to automatically determine an IP address associated with the at least one other physical device interface. In a variant of this aspect, the microprocessor automatically determines the IP address by sending a request to all possible IP addresses connected to the physical device interface. In another aspect of this embodiment, the first plurality of environmental feedback devices includes at least one of a fan, a scent emitter and a heating unit. Yet another aspect further comprises a plurality of ports configured to provide digital commands to a corresponding second plurality of environmental feedback devices. In a variant of this aspect, the plurality of ports is configured to wirelessly communicate the digital commands to the corresponding second plurality of environmental feedback devices.

In another embodiment of the present disclosure a system is provided for controlling environmental feedback devices of a virtual or augmented reality system, comprising: a plurality of interfaces including a parent interface and a plurality of child interfaces, each of the plurality of interfaces including a microprocessor being configured to control power flow to a first plurality of environmental feedback devices via a corresponding plurality of receptacles on the interface and to provide digital commands to a second plurality of environmental feedback devices via a corresponding plurality of output ports; and a computer coupled to the parent interface, the computer including software that when executed causes the computer to automatically identify IP addresses of the plurality of interfaces. In one aspect of this embodiment, the parent interface includes an Ethernet port for coupling to the computer. In another aspect, the plurality of output ports includes at least one USB port. In another aspect, the plurality of output ports provide communication connections between the plurality of child interfaces and the parent interface. In yet another aspect of this embodiment, the first plurality of environmental feedback devices include at least one of a fan, a scent emitter and a heating unit. In another aspect, the plurality of output ports include output ports that are configured to wirelessly communicate the digital commands to the second plurality of environmental feedback devices. In still another aspect, each of the receptacles is configured to receive a standard electrical plug.

In another embodiment, the present disclosure provides a method for controlling environmental feedback devices in a virtual or augmented reality system, comprising: providing a communication link between a computer and a parent interface; providing communications links between the parent interface and a plurality of child interfaces; coupling a plurality of environmental feedback devices to the parent interface and the plurality of child interfaces; sending digital commands to operate the plurality of environmental feedback devices from the computer to the parent interface; multicasting the digital commands from the parent interface to the plurality of child interfaces; and signaling the plurality of environmental feedback devices to operate by transferring the digital commands to the plurality of environmental feedback devices. One aspect of this embodiment further comprises coupling a second plurality of environmental feedback devices to a corresponding plurality of power receptacles disposed on the parent interface and the plurality of child interfaces. Another aspect further comprises controlling operation of the second plurality of environmental feedback devices by controlling power flow to the corresponding plurality of power receptacles. In another aspect, the communication link between the computer and the parent interface is an Ethernet port. In yet another aspect, the communication links between the parent interface and the plurality of child interfaces include at least one wired connection and at least one wireless connection.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
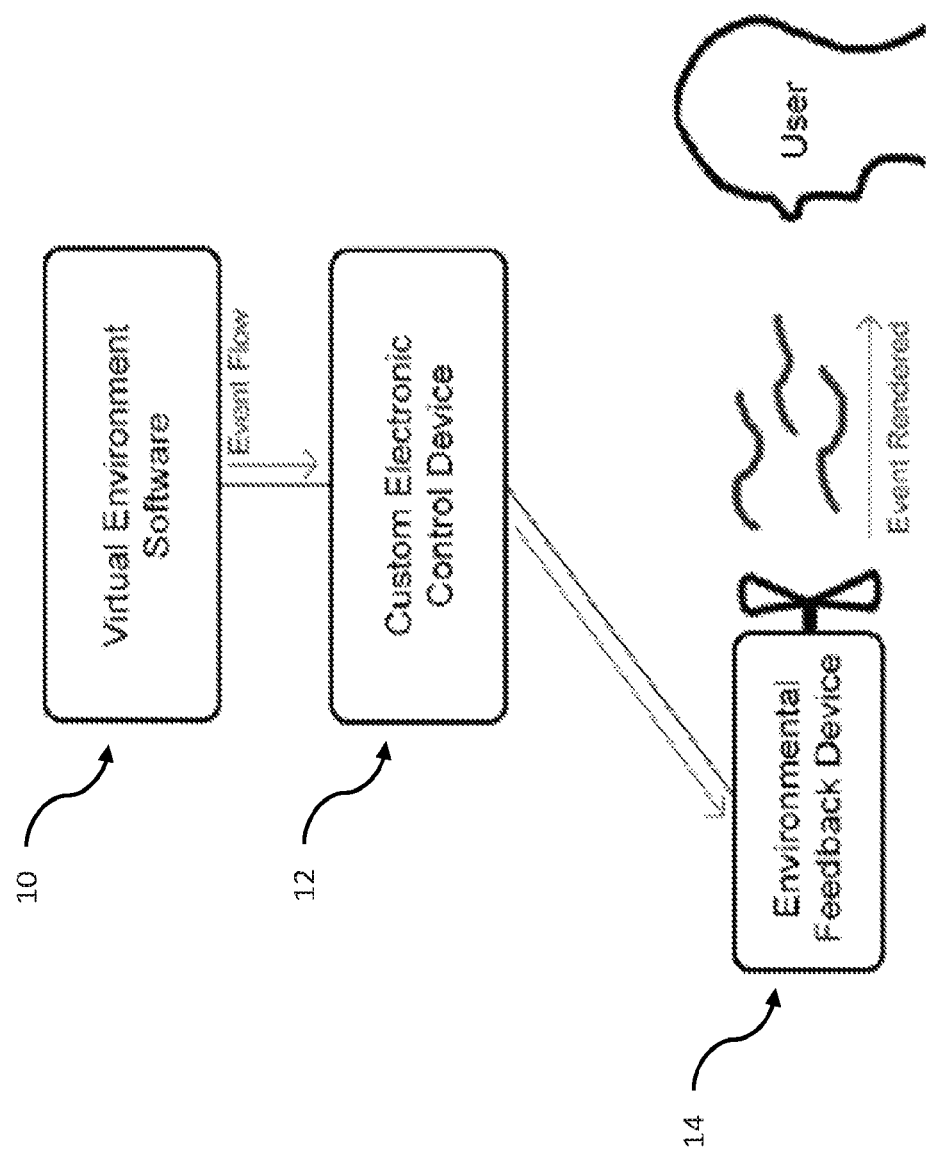
FIG. 1 is a conceptual diagram of a prior art VR system.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize its teachings.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 2:
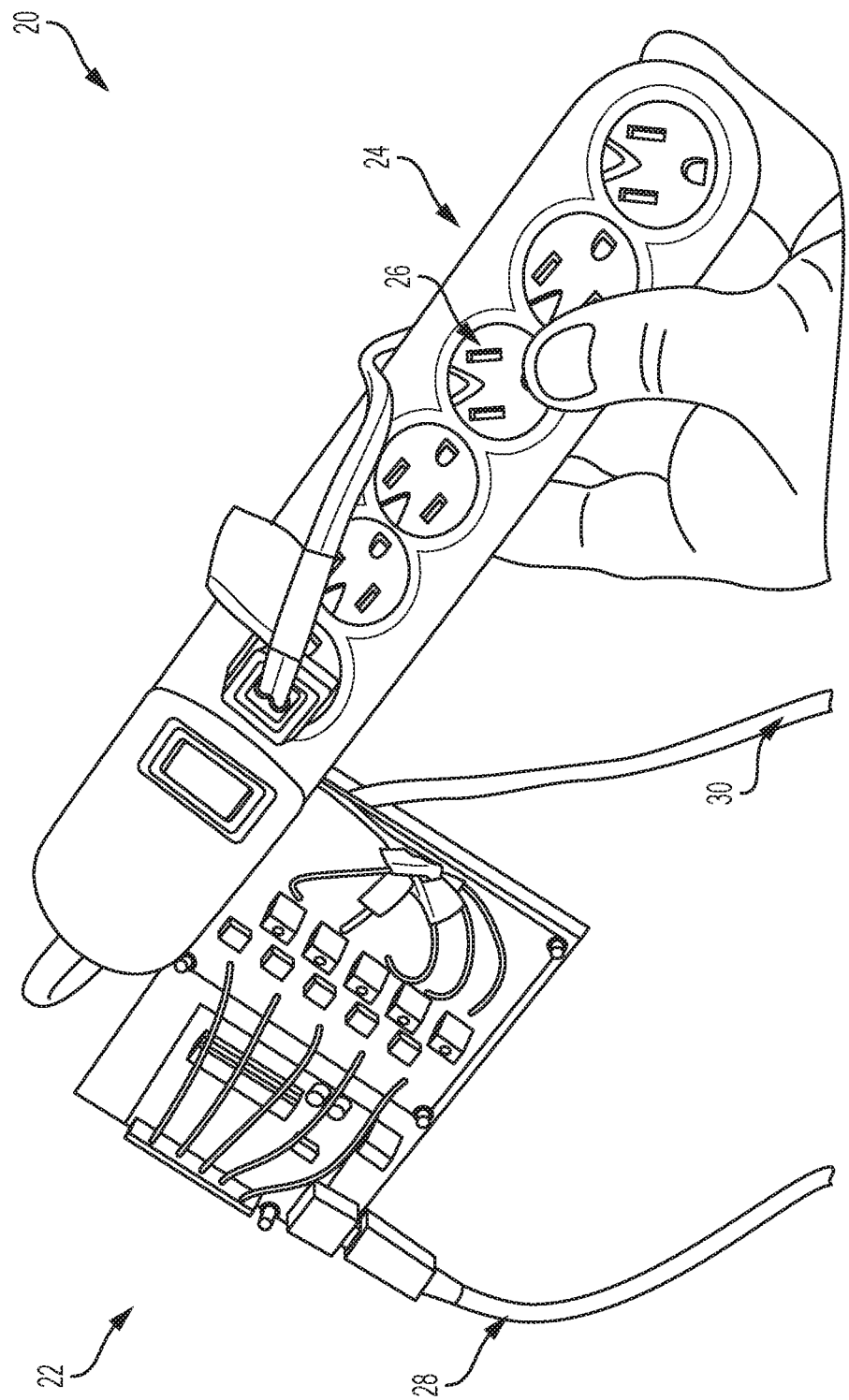
FIG. 2 is a perspective view of a prior art EFD controller.

Referring now to FIG. 2, a Prototype System 20 was designed to control stationary EFDs as opposed to head mounted or worn EFDs. Wind output design studies have shown results of a higher perceived presence from stationary EFDs to head worn EFDs. This design condition is reasonable considering most EFDs are not designed to be head mounted. A node of Prototype System 20 represents a channel based design. Each of these channels is controlled by a microprocessor board 22 and an electronic gate. This channel design offers versatility in adapting Prototype System 20 to different VR systems. For example a VR system hosting a standing user might require more channels than a VR system hosting a seated user because of the standing user's ability to traverse a larger floor space.

The Prototype System 20 consists of a modified power strip 24 where each of the plug electrodes 26 are independent. Each of electrodes 26 are connected to a corresponding channel with one electronic gate that controls the electrical current flow as is further described below. By default, these channels are off. In one embodiment, each electronic gate connects to an attached Arduino UNO microprocessor system 22. As shown, only two cords leave the device—A USB cable 28 that plugs into the VR system host computer and a standard wall electrical socket plug 30. USB cable 28 is responsible for serial communication between the VE development software and the Arduino ATMega328 microprocessor 22 and for providing 5 volt power. Wall socket plug 30 delivers standard wall power that will be switched on/off by the electronic gates. EFDs plug directly into the power strip plug electrodes 26.

The controlling circuit of Prototype System 20 has a low voltage portion housing Arduino UNO microprocessor system 22. The Arduino UNO microprocessor system 22 was chosen because it is a commonly used microprocessor open development platform. The hardware and integrated development environment of system 22 can be freely licensed under the "Creative Commons Attribution-ShareAlike 3.0 License."

Figure 3:
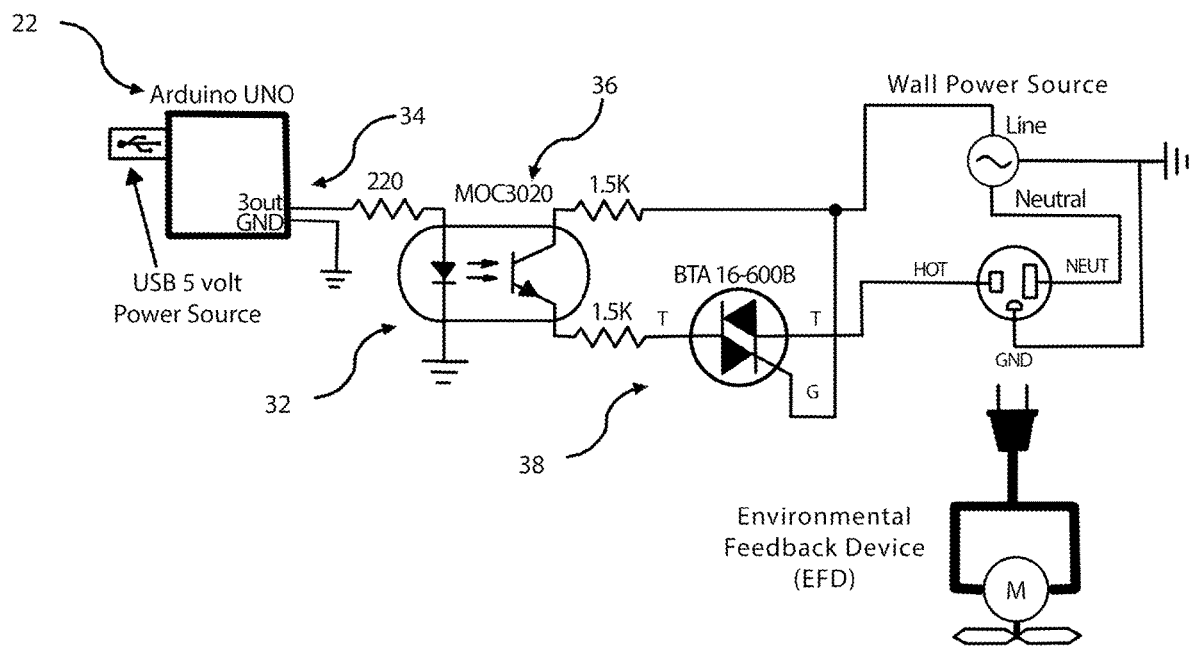
FIG. 3 is a schematic diagram of a channel of a prior art EFD controller.

FIG. 3 is a schematic of a single channel of Prototype System 20. Electronic gates 32 are wired into the output channels 34 of the microprocessor 22. Gates 32 are constructed from MOC3020 opto-isolators 36 to allow the 5 volt portion of the circuit to elicit control of the high voltage portion. The opto-isolators 36 are connected to a BTA 16-600B triac 38 facilitating high voltage on/off switching.

Prototype System 20 software design includes a plugin component compatible with the Unity development editor as well as an EFD behavior control firmware uploaded to the Arduino microprocessor 22. Within the Unity editor a plugin is imported as a .unitypackage file containing a .cs C#class, models, and unity prefab objects. Developers need only to add the script into the scene hierarchy and add environmental event sensors to their user's GameObject. Prototype System 10 can sense Unity wind zones, collider triggers for heat zones, and collider triggers for vibration zones. Developers can apply these zones and triggers freely to a VE using the Unity editor's drag-and-drop interface.

The .cs class of Prototype System 20 contains default public parameters for each channel allowing developers to access EFD channel states directly from other scripts. These public parameters are integer values each assigned to a single channel. The values comprise a single data packet that is sent to the microprocessor firmware to be parsed and ultimately rendered from each channel EFD. Table 1 displays optional packet constructor values to control any number of EFD channels.

TABLE 1

Default data packet constructor values.

| Packet Constructor Options | EFD Channel #1 | EFD Channel #n |
|---|---|---|
| EFD off | 0 | 0 |
| EFD on | 1 | 1 |
| EFD low intensity | 2 | 2 |
| EFD medium intensity | 3 | 3 |
| EFD high intensity | 4 | 4 |

The length of a data packet is equal to the quantity of EFD channels being used plus one checksum value for error checking. For example the Prototype System 20 hardware pictured in FIG. 2 supports up to 6 EFD channels so the appropriate length of a data packet to control this device would be 6 constructor values plus 1 value for error checking.

Figure 4:
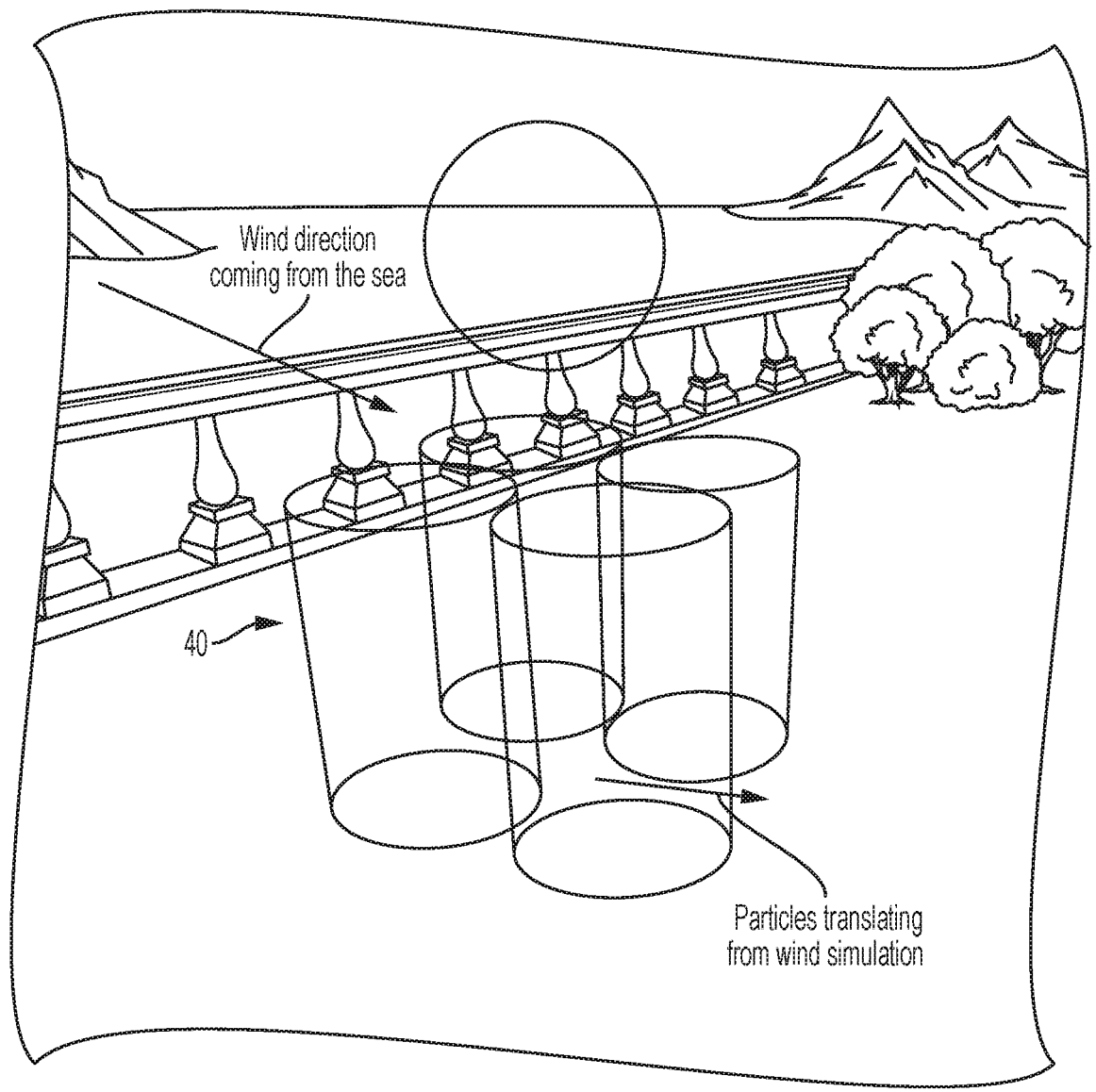
FIG. 4 is a conceptual view of a wind triggering event in a prior art VE.
Figure 5:
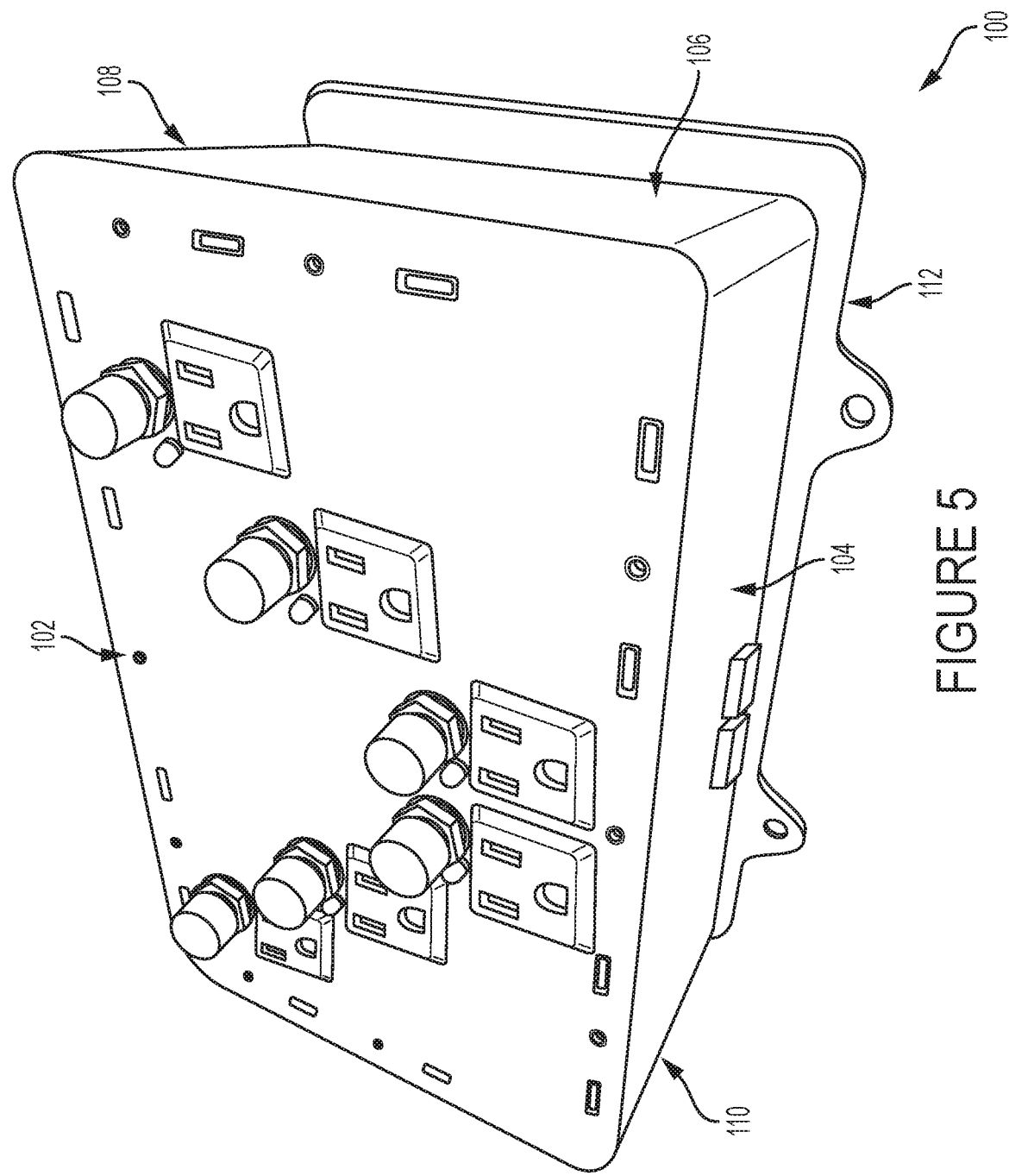
FIG. 5 is a perspective view of a physical device interface according to the teachings of the present disclosure.

Environmental sensors, attached as children to the user GameObject within the VE, inherit the user's transformations and rotations. This allows for the hardware EFDs to be arranged in a static real-world position around the user. FIG. 4 shows five virtual wind sensors 40 arranged around a user GameObject within the unity editor. Each of these virtual sensors are comprised by a non-rendered cylinder or sphere 3D model with a particle system emitter positioned within. As these virtual sensors travel with the user, Unity wind zones translate the emitted particles in accordance with the Unity physics simulation. This effectively acts like a weathervane. When these particles collide with the interior walls of the cylinder, appropriate wind events are captured and communicated to the Prototype System's 20 class script and ultimately rendered from one or more of the associated connected fans. This approach to sensing wind was created as a result of the limited wind sensing support built into the Unity scripting library.

The default behavioral control firmware uploaded to the microprocessor is designed to parse incoming data packets and helps to control the behavior of the attached EFD. Developers have access to modifying this firmware. For example, fans are effective for rendering wind, but most household fans are built simply for on/off use. Intensity control is a desirable feature and can easily be achieved by adding a timer based pulse width modulation loop as an optional on state. Additional pulse width modulation loops can be created for low, medium, and high intensity behaviors. This strategy can also be applied to vibration motor behavior. This is, however, not recommended for household heaters or infrared heat lamps because they are not designed to handle pulse behaviors, and may result in a safety hazard.

Figure 6:
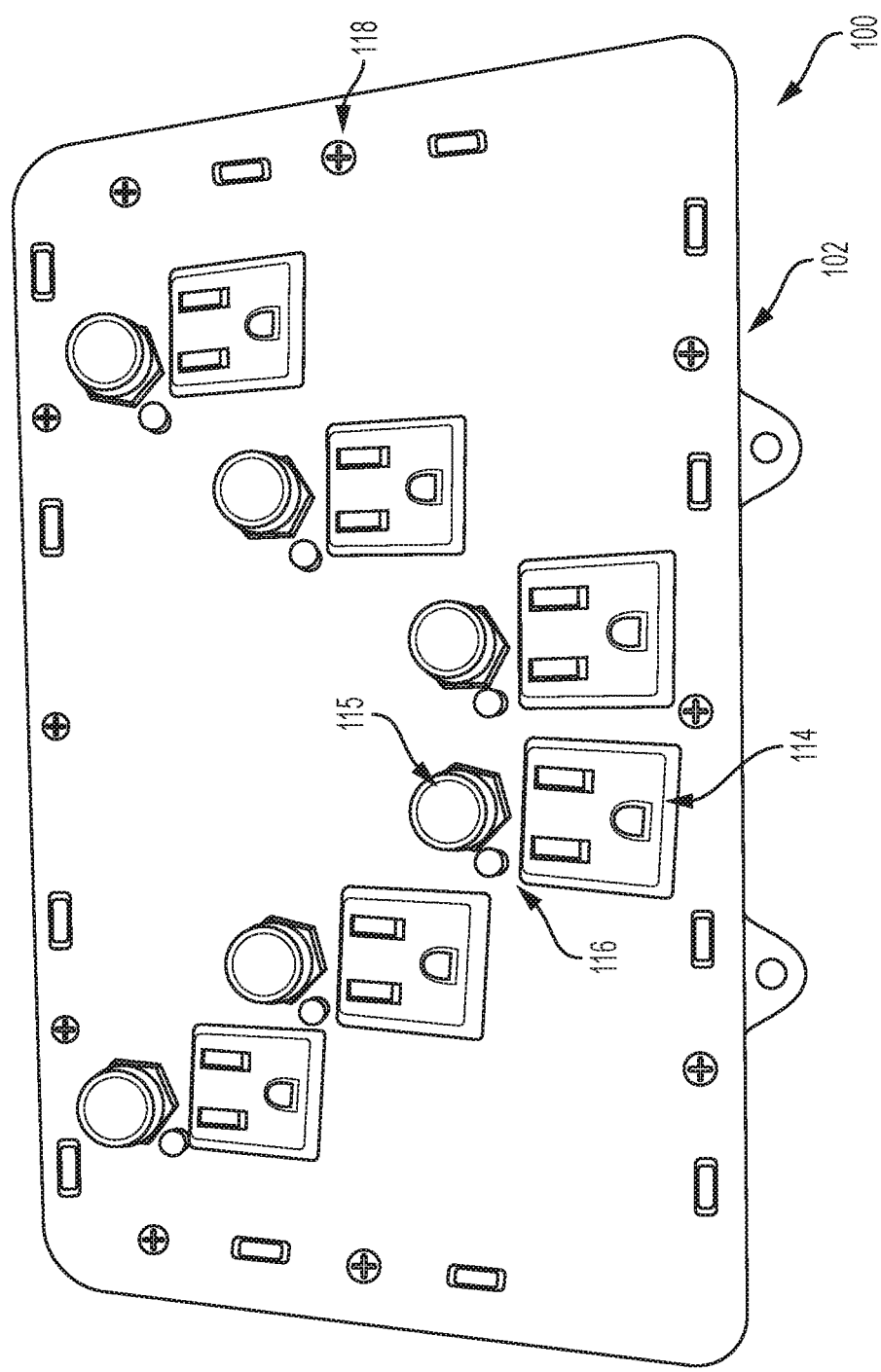
FIG. 6 is a top view of the interface of FIG. 1.

FIGS. 5-14 depict one embodiment of a physical device interface according to the principles of the present disclosure. As shown, interface 100 is configured in the shape of a box having an upper wall 102, a front wall 104, a first side wall 106, a rear wall 108, a second side wall 110 and a lower wall 112. As best shown in FIG. 6, upper wall 102 includes a plurality of receptacles 114 (in this example, six) for receiving the plugs from power cords of physical devices or EFDs such as fans, heat lamps, and other devices. A fuse 115 is associated with each receptacle 114 and is wired to prevent excessive current from being drawn by a physical device (e.g., in the case of a malfunction of the device) by opening the connection from 120V AC input power in a manner that is known in the art. An LED 116 is also associated with each receptacle 114 and is wired to indicate when the receptacle is active (i.e., providing power to the physical device plugged into the receptacle). In the embodiment shown, upper wall 102 includes a plurality of openings (not shown) for receiving bolts 118 that attach upper wall 102 to the rest of interface 100.

Figure 7:
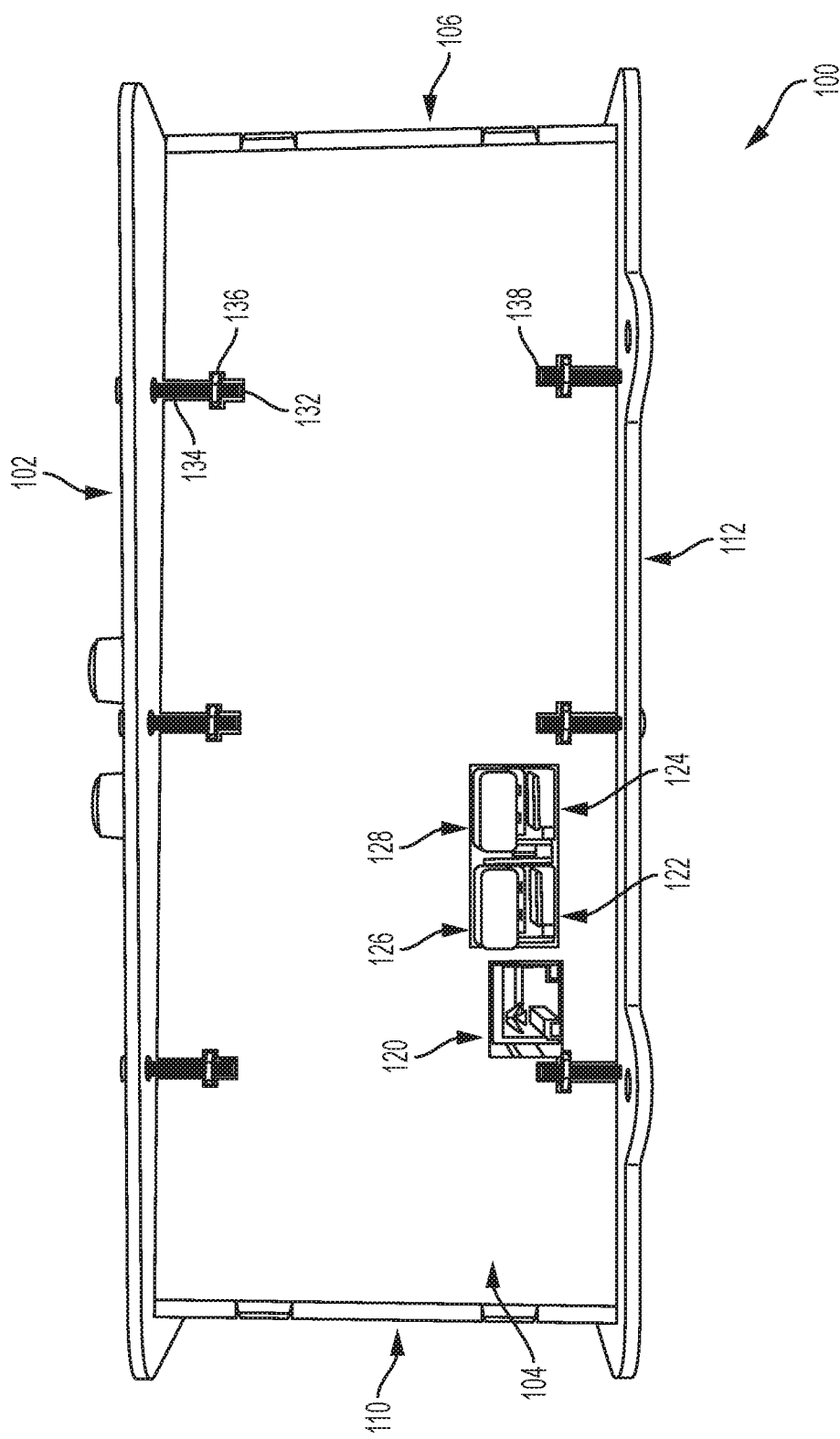
FIG. 7 is a front view of the interface of FIG. 1.
Figure 13:
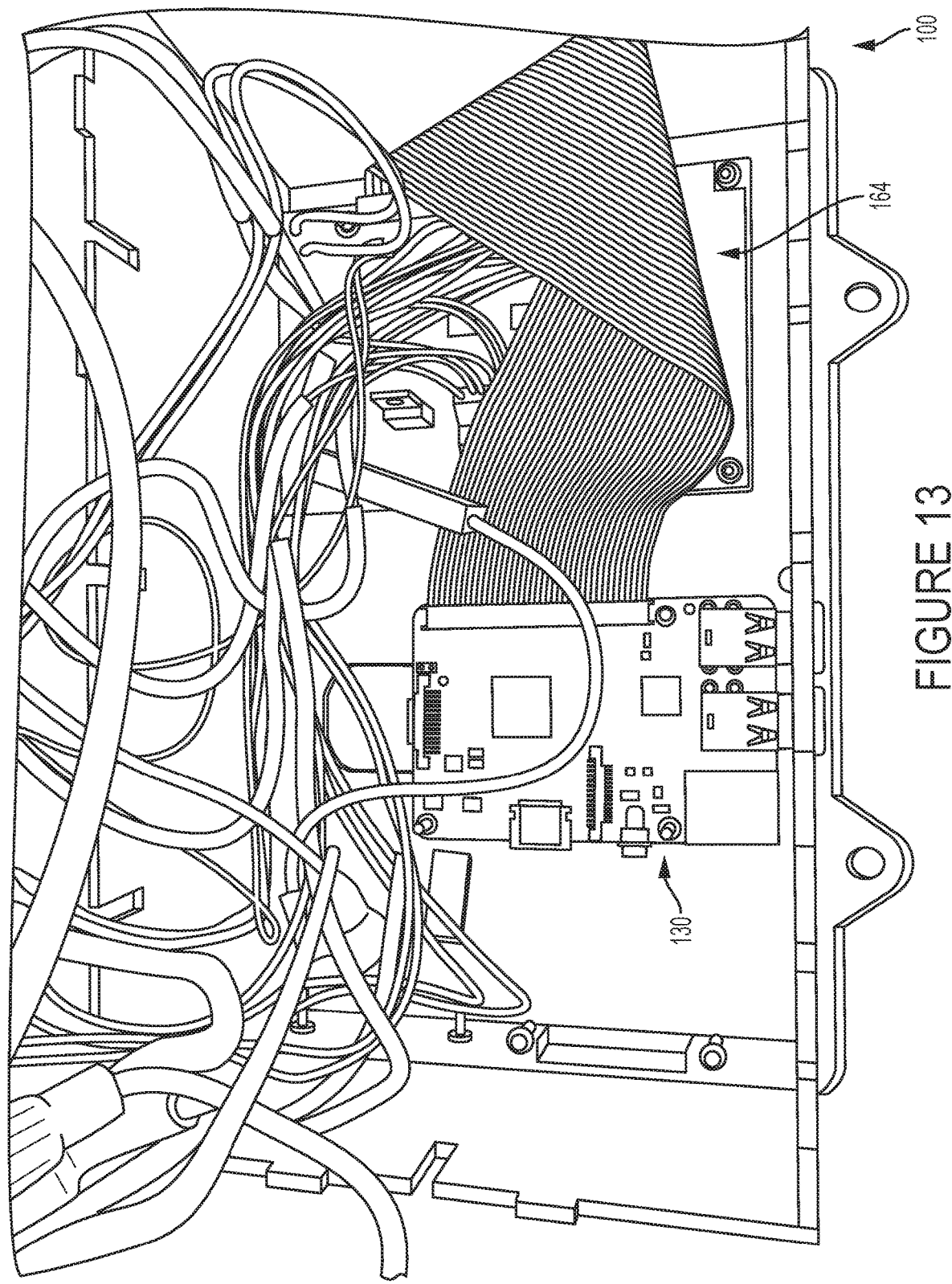
Figure 14:
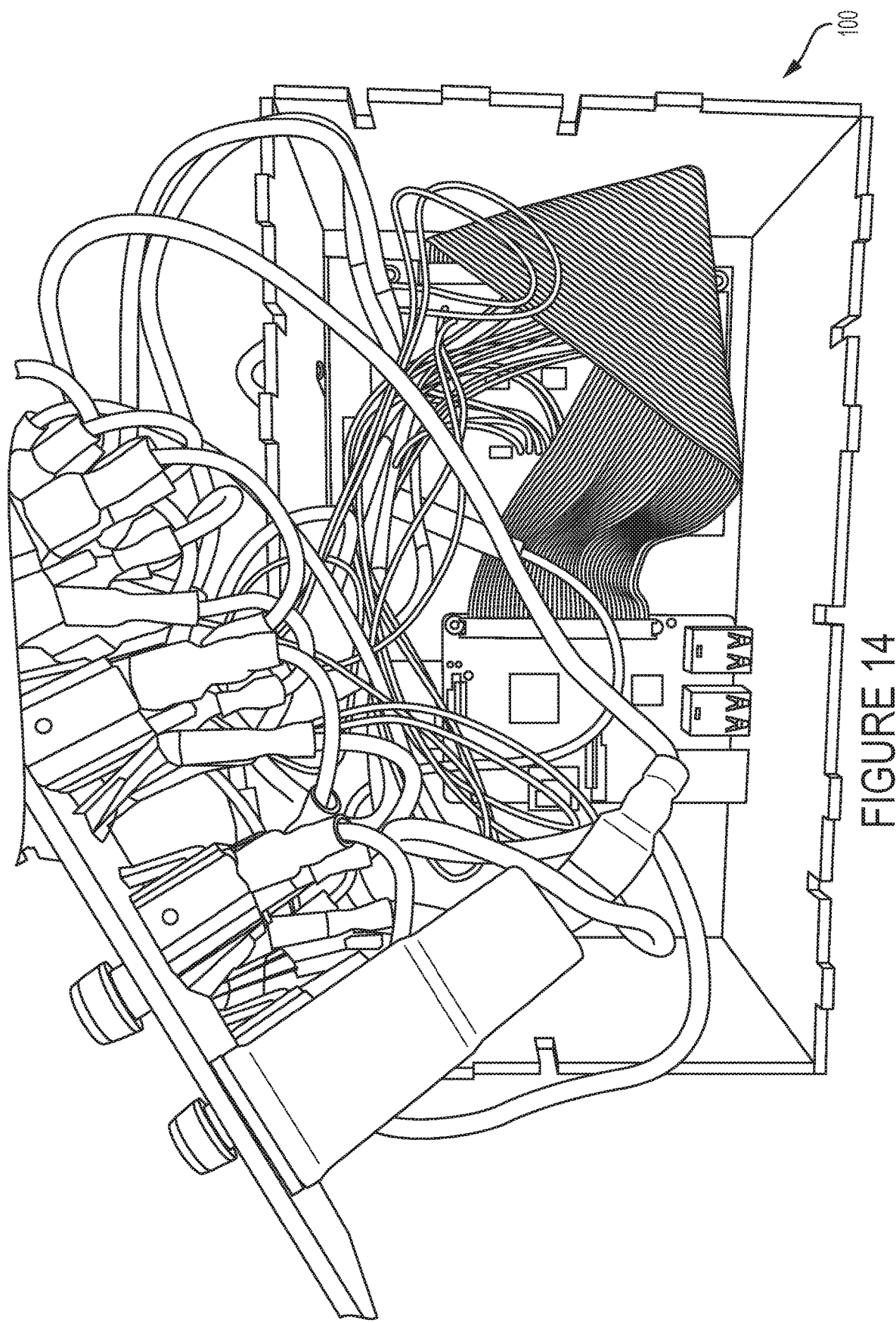

As best shown in FIG. 7, front wall 104 includes an Ethernet port 120 for coupling interface 100 to a host computer, and a pair of openings 122, 124 that expose USB ports 123, 125, 127, 129 that permit connections to EFDs and receive wi-fi adaptors 126, 128 which are connected to microprocessor board 130 (FIG. 13). Wi-fi adapters 126, 128 are configured for two purposes. The first wi-fi adapter 126 is configured in firmware to function as a receiving network connection to be used instead of the Ethernet port 120. In this manner, either Ethernet port 120 or wi-fi adaptor 126 network connections be connected to the user's standard network. The option of using a wireless network connection allows developers to use less cabling infrastructure while using many interfaces 100. Ethernet port 120 hard wired connection is provided in scenarios where a potential loss of network signal is unacceptable which is more likely when using a wireless network interface. Second wi-fi adapter 128 is configured in firmware to act as a localized wi-fi access point. The purpose of this local access point is for remote configuring of the explicit interface 100. For example if an interface 100 fails to receive network communication from the user's standard network, the wi-fi access point provided by wi-fi adapter 128 allows a user to directly connect to the box and administer troubleshooting procedures.

Front wall 104 also includes a plurality of upper cut-outs 132 which receive bolts 134 extending through upper wall 102 and retain nuts 136 to fasten upper wall 102 to front wall 104 and a plurality of lower cut-outs 138 which are used to fasten lower wall 112 to front wall 104 in the same manner.

It should be understood that any of a variety of different connection mechanisms may be used to connect the walls of interface 100.

Figure 8:
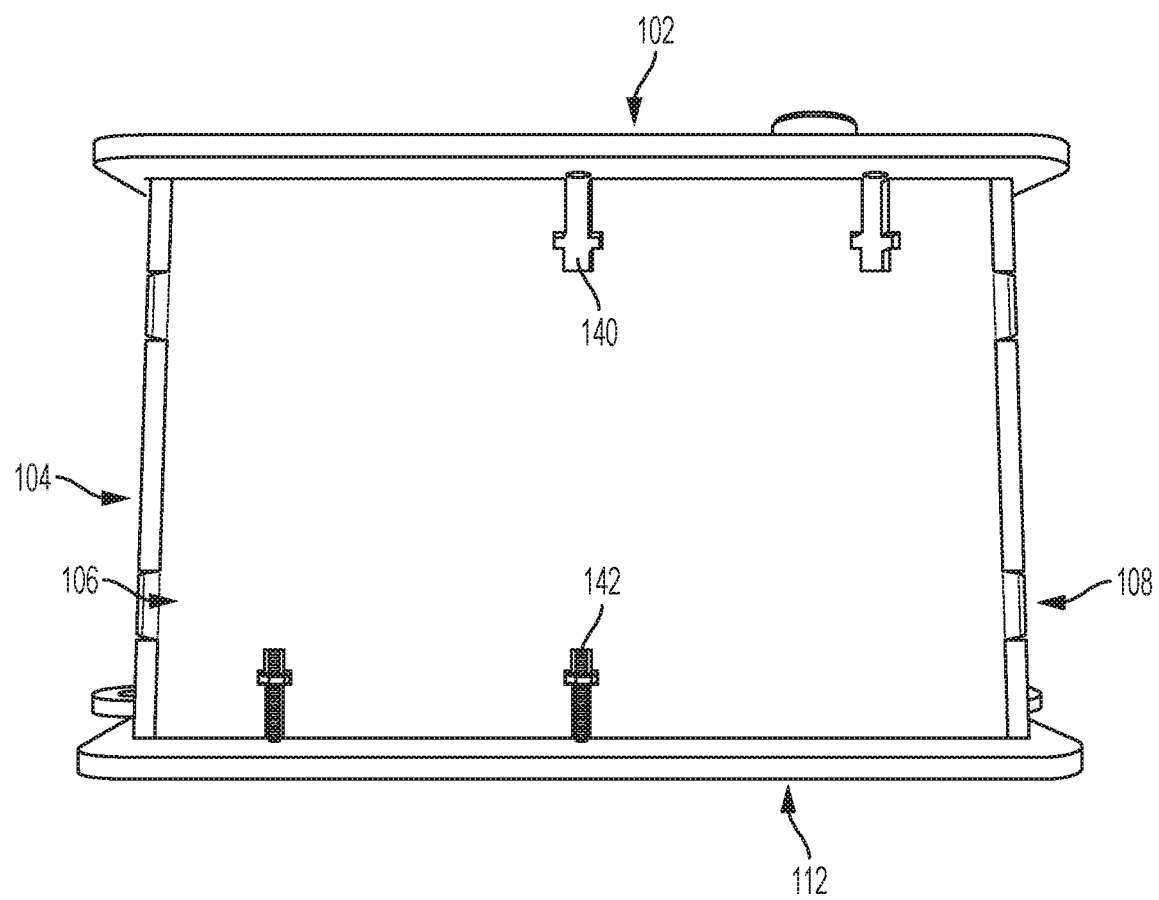
FIG. 8 is a side view of the interface of FIG. 1.
Figure 9:
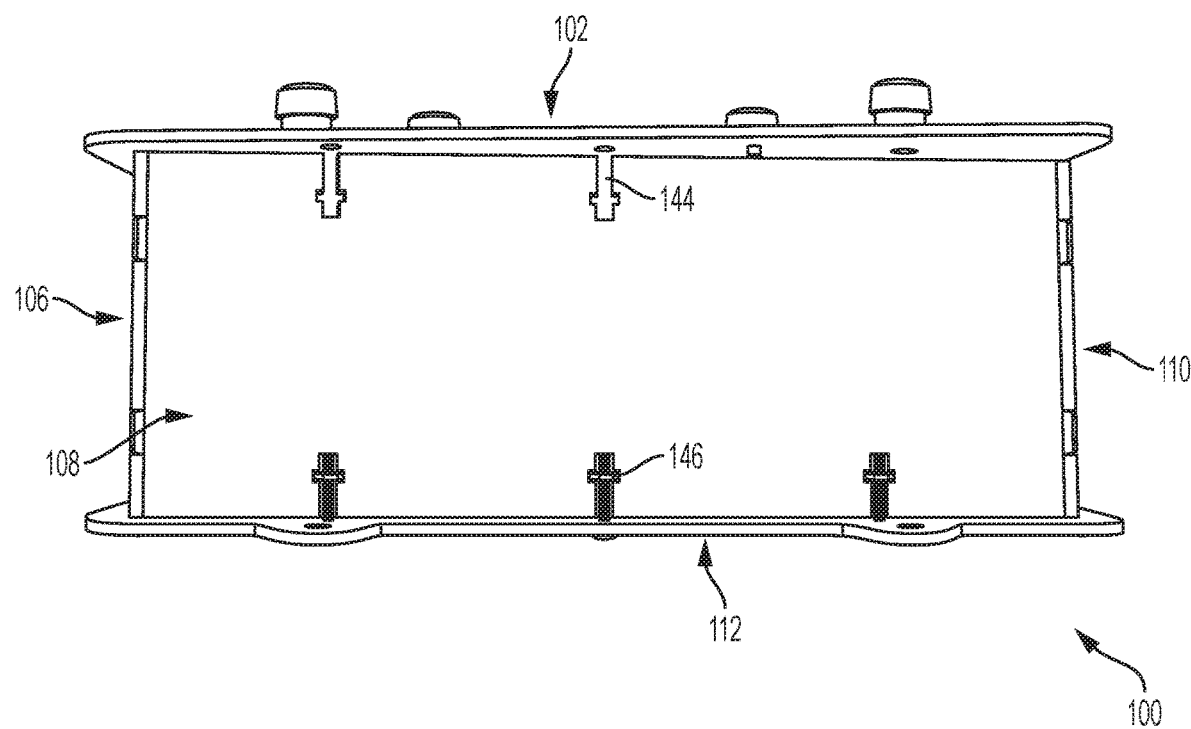
FIG. 9 is a rear view of the interface of FIG. 1.
Figure 10:
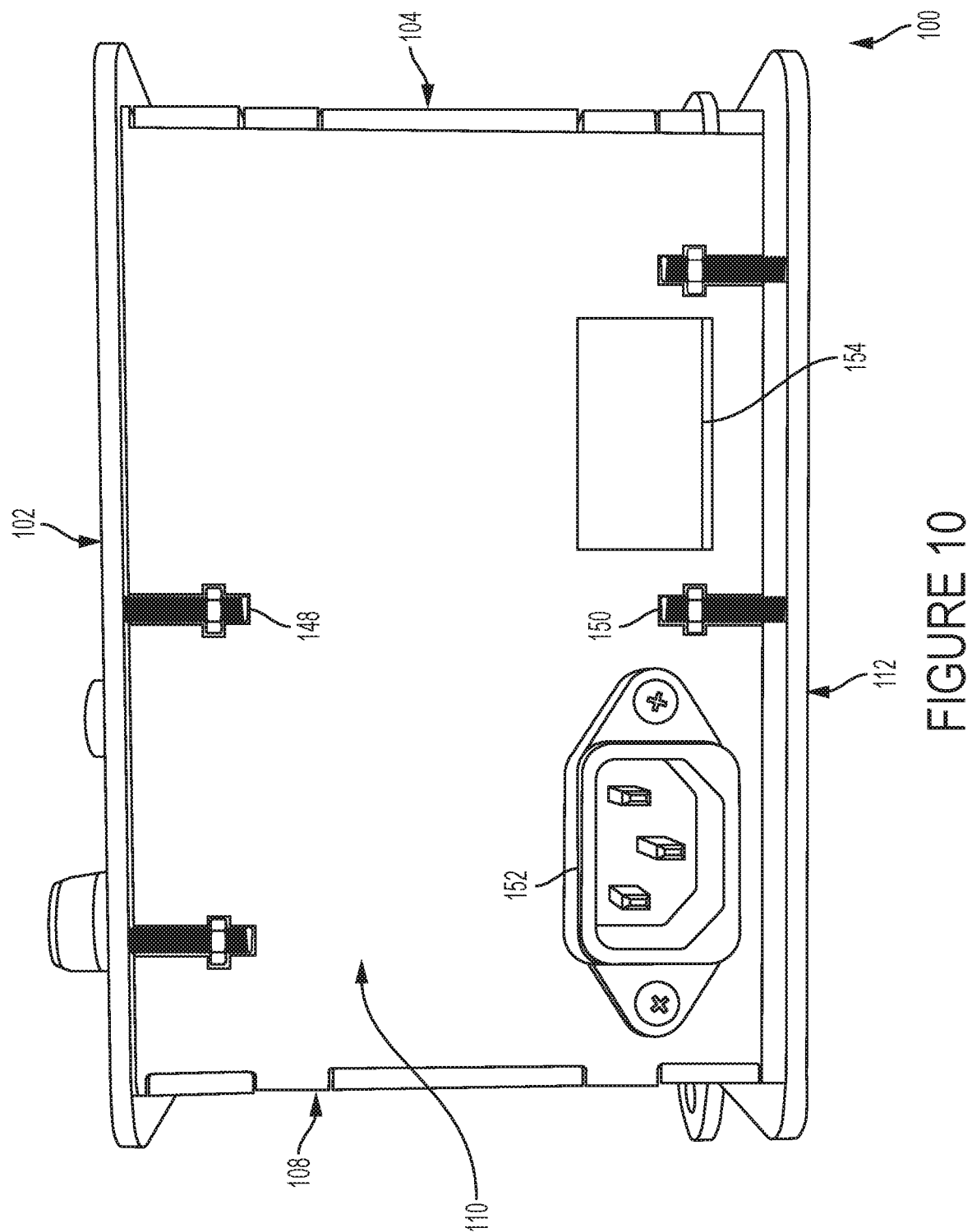
FIG. 10 is a side view of the interface of FIG. 1.

Referring now to FIG. 8, first side wall 106 also includes a plurality of upper cut-outs 140 and a plurality of lower cut-outs 142 which perform the function described above. Similarly, rear wall 108 (FIG. 9) includes a plurality of upper cut-outs 144 and a plurality of lower cut-outs 146. As best shown in FIG. 10, second side wall 110 also includes upper cut-outs 148 and lower cut-outs 150, as well as a receptacle 152 for receiving a plug from a 120V AC power source such as an extension cord plugged into a wall outlet. Second side wall 110 also includes an opening 154 which permits access to the video out port of microprocessor board 130. This connection permits a monitor to connect to microprocessor board 130 for configuration purposes. In typical operation, such configuration is performed via ports 126, 128 or 120.

Figure 11:
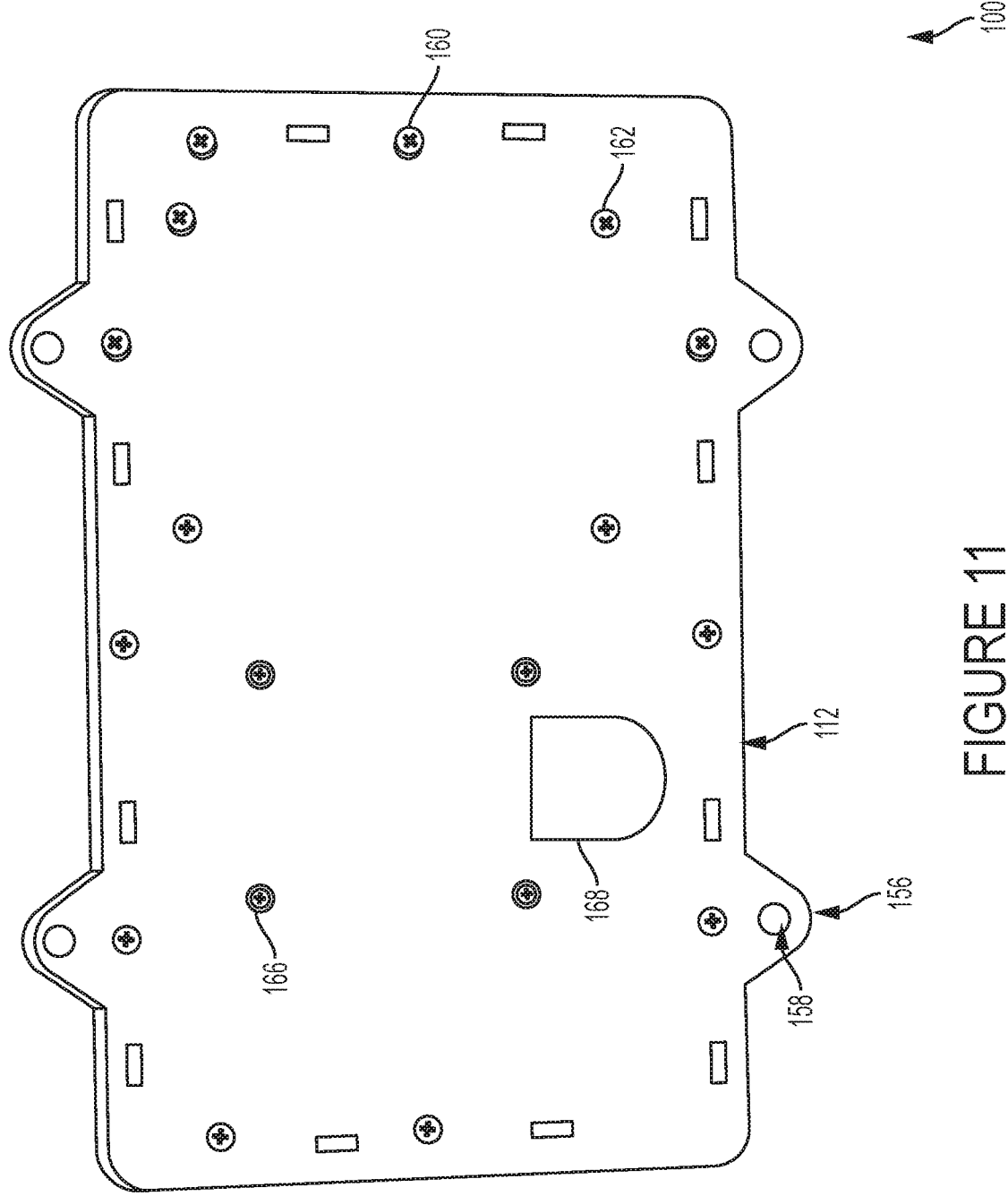
FIG. 11 is a bottom view of the interface of FIG. 1.
Figure 12:
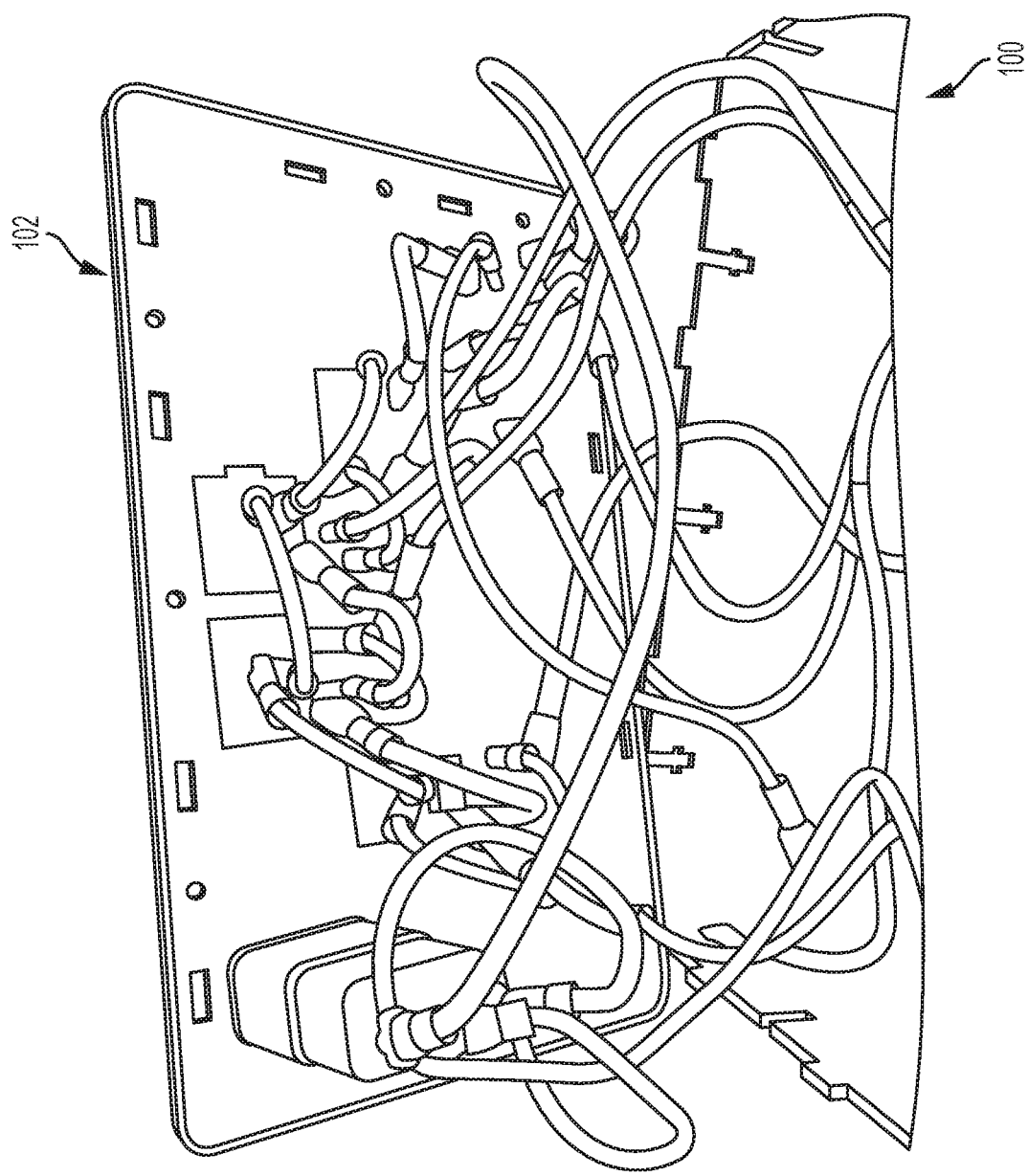
FIGS. 12-14 are perspective views of the interface of FIG. 1 in a partially disassembled state.

Referring now to FIG. 11, lower wall 112 includes a plurality of tabs 156 extending laterally from lower wall 112 and including openings 158 for receiving fasteners (not shown) to attach interface 100 to a mounting surface. Lower wall 112 also includes a plurality of openings (not shown) for receiving fasteners 160 that attach lower wall 112 to the rest of interface 100. Lower wall 112 further includes a plurality of openings (not shown) for receiving fasteners 162 that connect power board (FIG. 13) to lower wall 112 and a plurality of openings (not shown) for receiving fasteners 166 that connect microprocessor board 130 (FIG. 13) to lower wall 112. Finally, lower wall 112 includes an opening 168 which provides the user access to the microSD card containing the interface firmware.

Figure 15A:
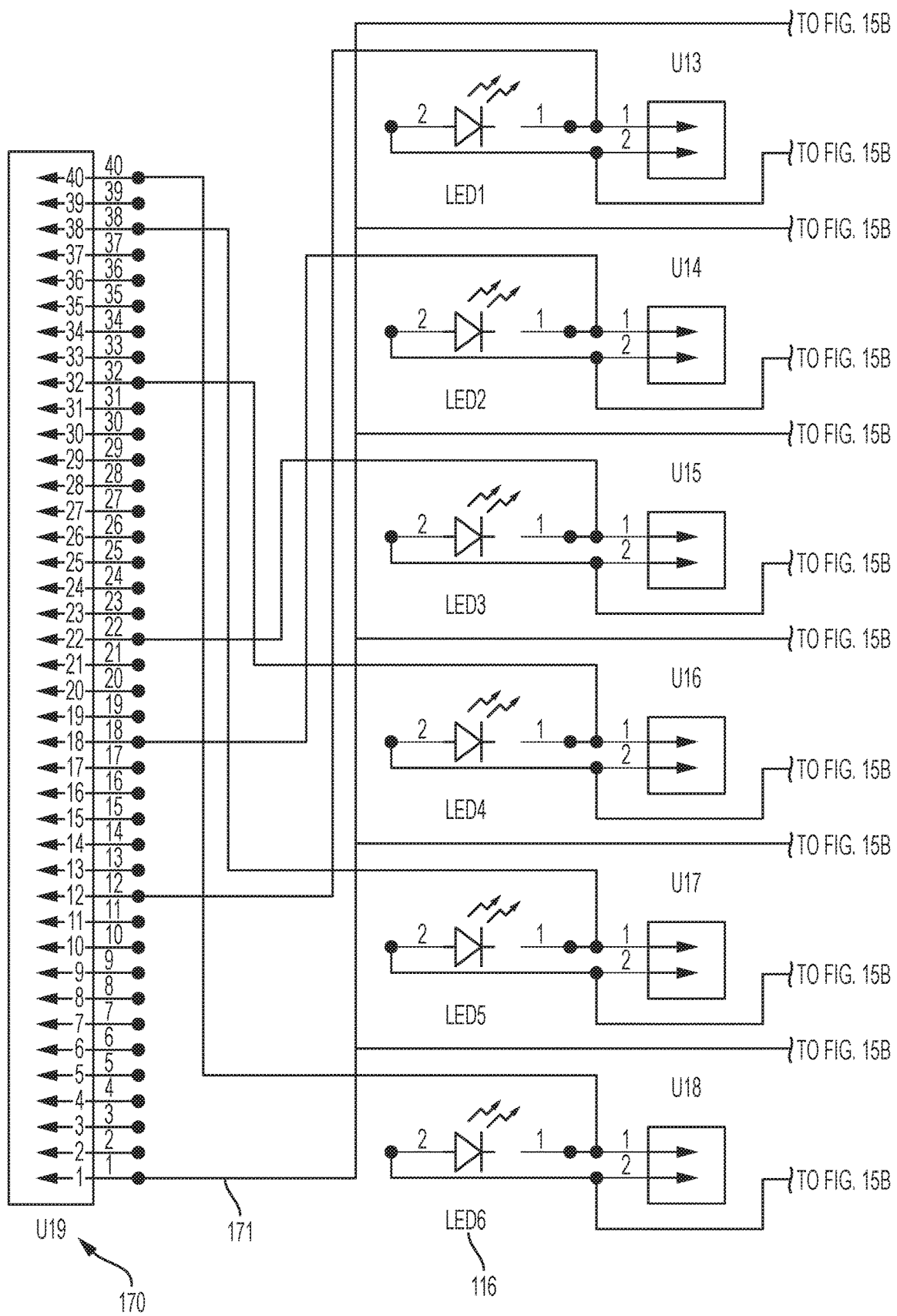
FIG. 15 is a partial schematic diagram of a power board of the interface of FIG. 1.
Figure 15B:
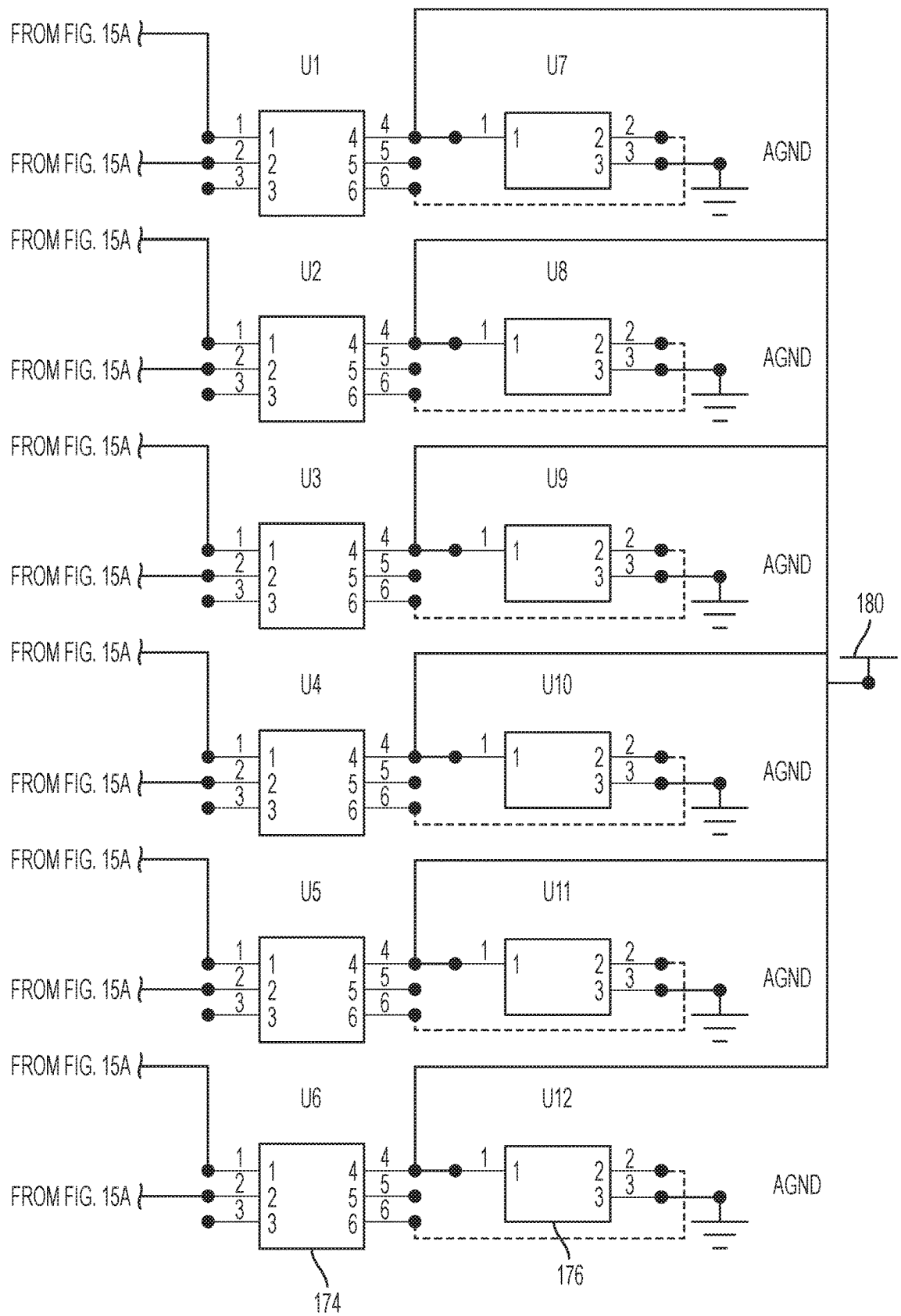
Figure 16:
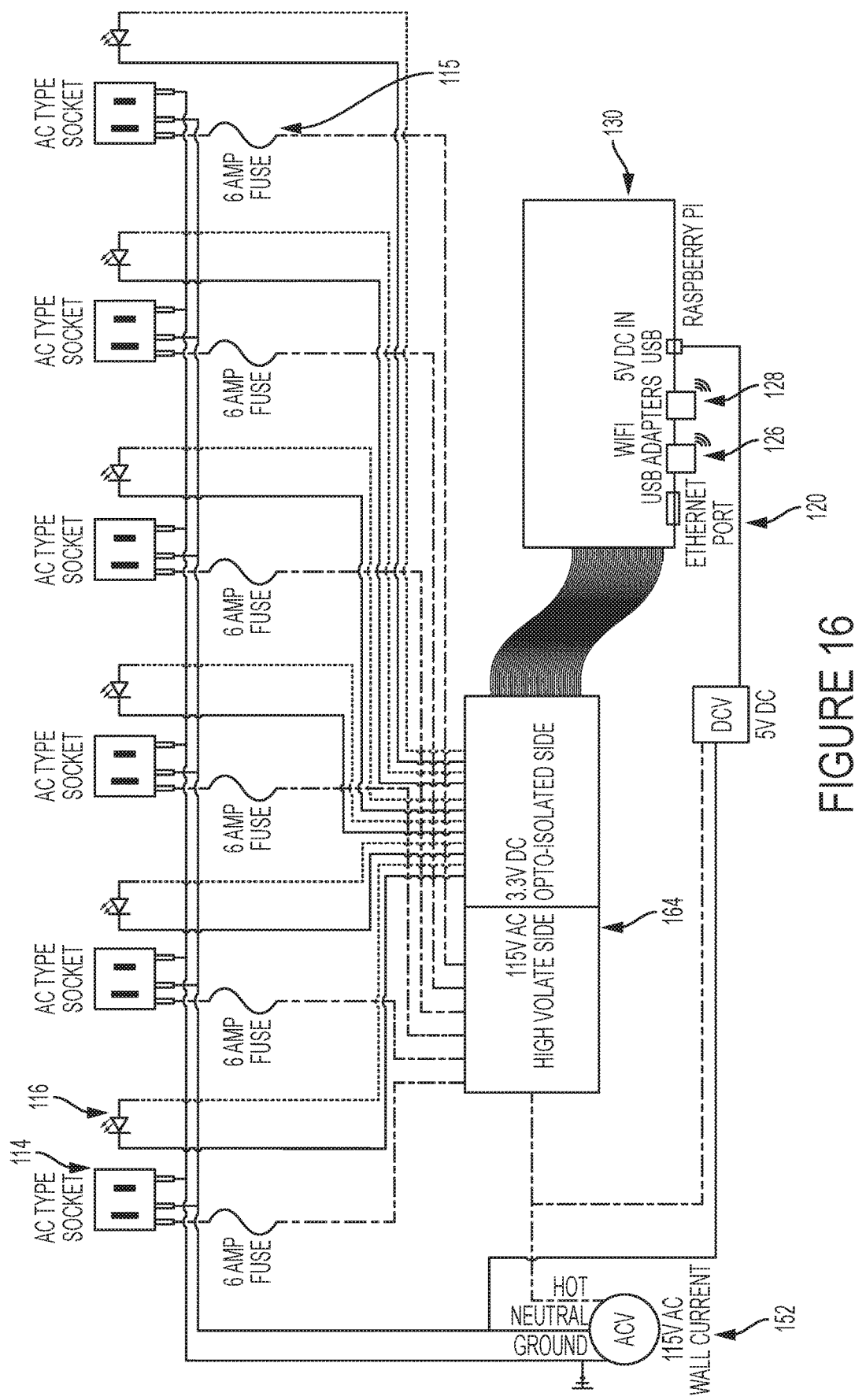
FIG. 16 is a schematic of the interface of FIG. 1.

Referring now to FIGS. 15 and 16, a 40 pin connector 170 is provided on power board 164, which is connected via a ribbon cable to microprocessor board 130. In one embodiment, microprocessor board 130 is a Raspberry Pi 2—Model B. Low voltage power is provided on line 171 from connector 170 to a plurality of optocoupler triacs 172 (e.g., MOC3020), one for each channel, which in this example corresponds to one for each receptacle 114. A control signal (ground in this example) is provided from connector 170 to cause current flow through optocoupler triacs 172 and LEDs 116 (which are mounted to upper wall 102 of interface 100). When current flows, LED 116 illuminates indicating to a user that the channel is active, and optocoupler triac 172 activates the corresponding triac switch 176 (e.g., T835-600G 8A triac switch components), which switches on 120V AC power to the corresponding receptacle 114 mounted to upper wall 102 of interface 100. In one embodiment, the ground symbols connected to pin 3 of triac switches 176 are actually the AC "hot" plugs of receptacles 114. The "neutral" and "ground" plugs bypass the circuit shown in FIG. 13 and are wired directly into the receptacles 114. Line 180 in FIG. 15 is connected to the "hot" plug of receptacle 152 (FIG. 10) which provides 120V AC wall current.

Figure 19:
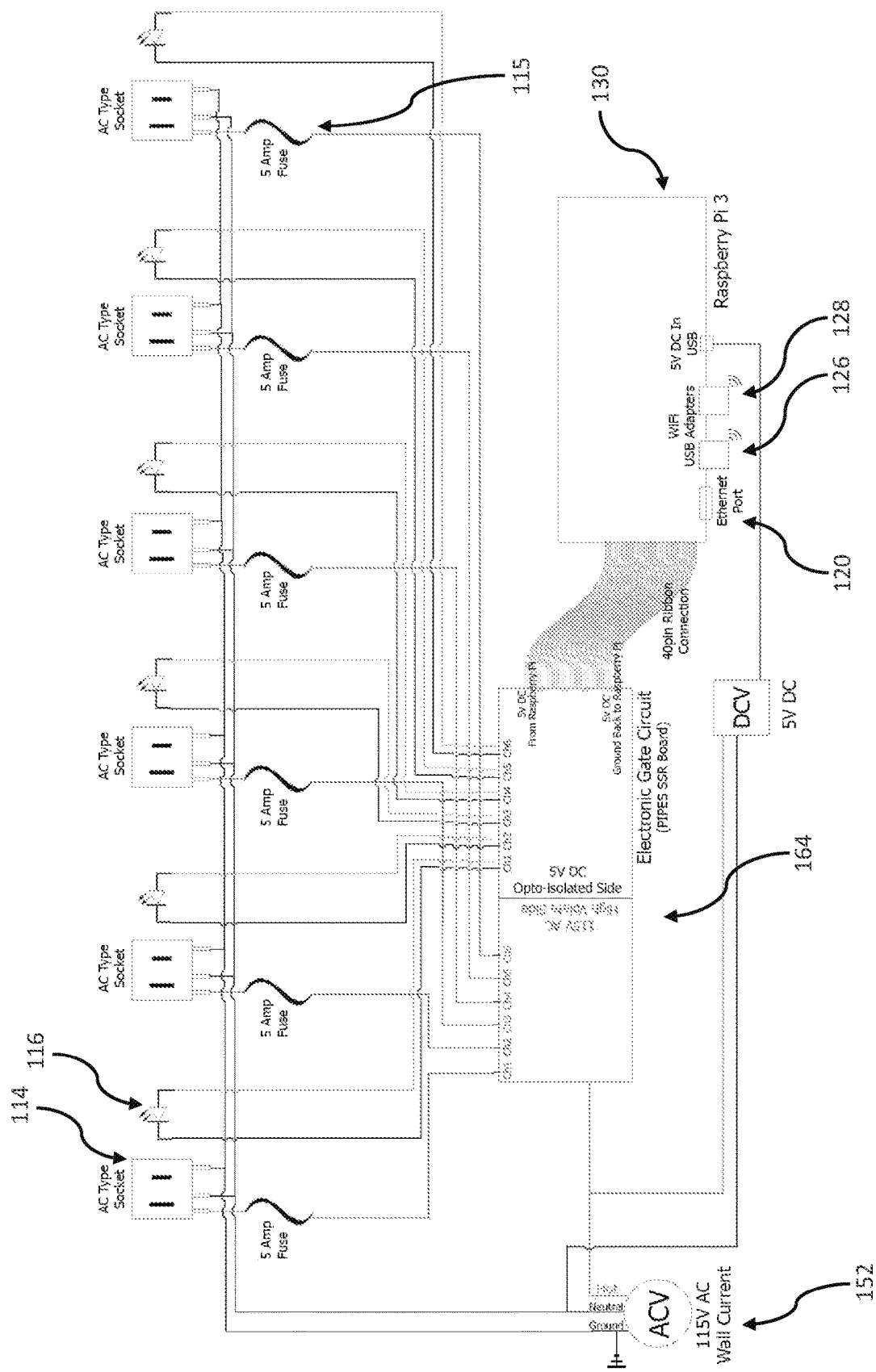
FIG. 19 is a schematic of another embodiment of an interface according to the present disclosure.

An alternative embodiment is depicted in FIG. 19. The embodiment of FIG. 19 differs from the embodiment of FIG. 16 in that the solid state relays operate with a 5 volt control voltage from the Raspberry Pi 3 microprocessor board rather than the 3.3 volt control voltage used in the embodiment of FIG. 16.

Figure 17:
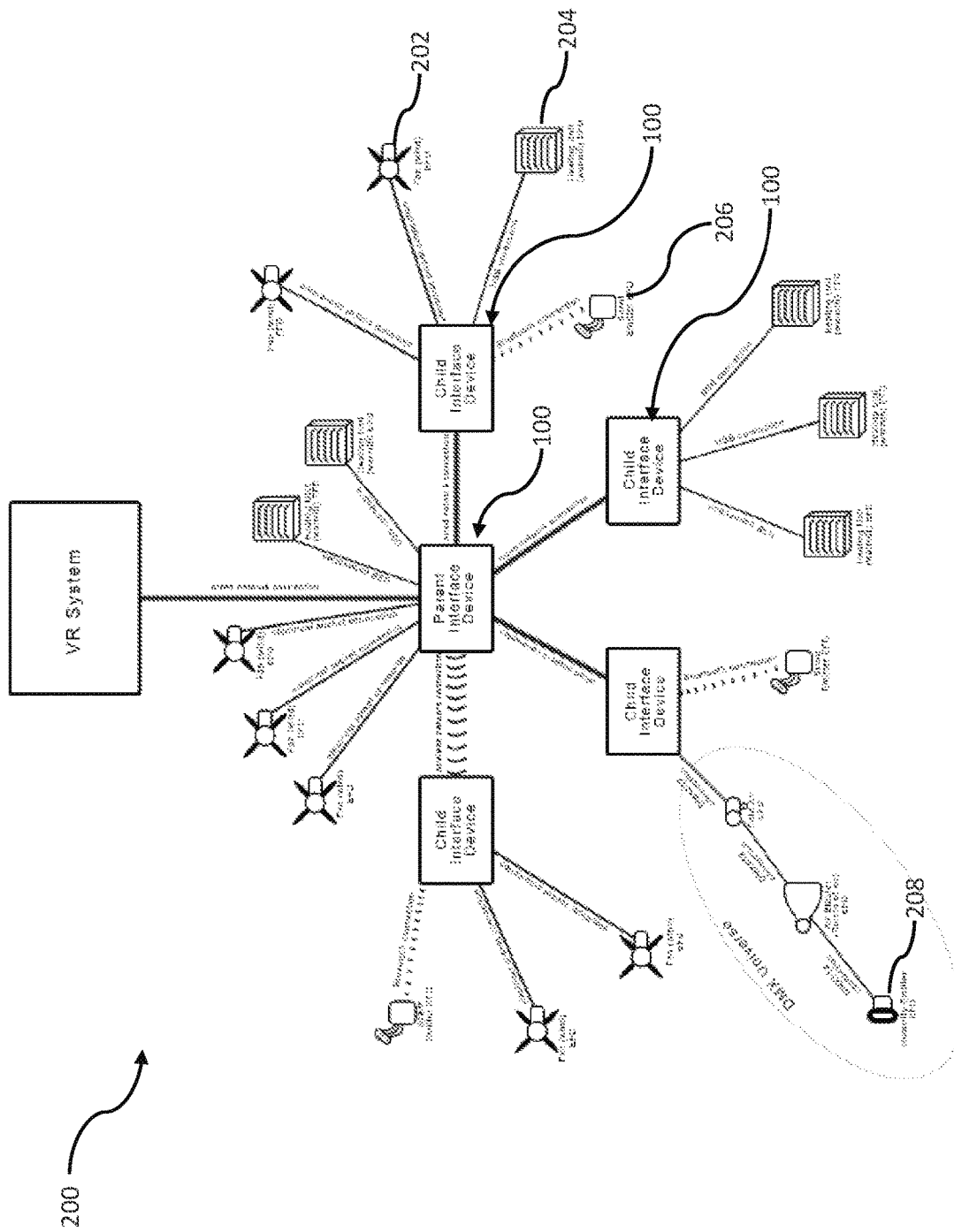
FIG. 17 is a conceptual diagram of a hub-and-spoke network according to the present disclosure.

The firmware in each interface 100 is configured to find every other interface's IP address across a standard network connection. This process is automatic. The configuration of this network 200 of connected VR interfaces 100 resembles a "hub and spoke" configuration where one interface 100 is considered the parent interface 100 and all of the rest connected are considered children interfaces 100 as depicted in FIG. 17. The connections between interfaces 100 may be wired connections (e.g., using USB ports 123, 125, 127, 129) or wireless connections (e.g., using wi-fi adapters 126, 128). After other interface 100 IP addresses are found over the network they are stored on a list within each interface 100. One interface 100 is configured within its firmware to act as a "parent" while all other interfaces 100 are acting as "children" to the parent by default. Developers need only send data packets from their software application to the parent interface 100. As data packets are received the parent interface 100 will copy and send each data packet to all connected children interfaces 100. This allows a developer to control any number of chained interfaces 100 from their application as is further described below.

The automatic scanning process described above provides a more user-friendly experience for developers within the setup process of interfaces 100. Without this automatic scanning process the procedure for setting up interfaces 100 would require developers to manually survey their standard network for each IP address of each connected interface 100, and create a list of these IP addresses. Next this list would have to be manually uploaded to the interface 100 that is configured as the parent. The manual procedure described above would be time consuming and tedious for developers to set up a system. It should be noted that as used herein, the term "system" refers to a hardware and software system for VR or AR where physical interfaces 100 are present with assigned EFDs. It should be further understood that the term "assigned" is used to refer to EFDs that are physically attached via cable or wirelessly connected via radio frequency signals to an individual physical interface 100.

It is important to note that a system builder (i.e., someone in charge of constructing and configuring a new VR or AR system connected over a network to interfaces 100 and their assigned EFDs) may use more than one interface 100 for two logical reasons. First, multiple interfaces 100 will allow for more EFDs to be controlled beyond what can physically be controlled by one interface 100 alone. Second, by using multiple interfaces 100 a system builder may choose to place each interface 100 around a real world environment to minimize the length of cables or wireless transmission distance between each interface 100 and it's assigned EFDs. When using multiple interfaces 100 together connected to a common computer network it is necessary to establish a network configuration process that will need to be completed by a system builder during the construction of a system. When multiple interfaces 100 are connected to a network they are assigned an internet protocol address (IP address) from the network router. A system builder will organize the IP addresses of the interfaces 100 in an interface network extensible markup language (XML) file using device manager software that can be accessed from the virtual reality or augmented reality computer. The system builder first conducts a network scan from the device manager software where all connected interfaces 100 on the network are discovered and their IP addresses are recorded into the interface network XML file. This network scan is conducted by automatically sending a ping request to all possible IP addresses within the network subnet. If interfaces 100 respond to the ping request a second message is sent to each interface 100 on a specific port and if interfaces 100 respond to the second message they are identified as a physical device interface 100 and their IP address is recorded in the interface network XML file. Once this scanning process is complete the system builder can set one of the found interfaces 100 as a "parent" interface and all of the other interfaces 100 become children of the parent interface 100 as indicated above. Digital commands sent from the VR or AR computer to the parent interface 100 are multicast or relayed on to all children interfaces 100. The purpose of setting up this hierarchy is so that the VR or AR computer only has to communicate with one interface 100. The final step the system builder must take in this network configuration process is to indicate the types of EFDs connected to each parent interface 100 or child interface 100. These EFD indications set by the system builder are recorded in the interface network XML file. When the system is running the VR or AR computer can reference the interface network XML file to create digital commands and to send digital commands to the parent interface 100.

It should be understood that EFDs as described herein are introduced devices that can be assigned to an interface 100 either by wired or wireless connection. EFDs are mounted in the real world within a virtual reality ("VR") or augmented reality ("AR") system. When the VR or AR system computer communicates with a single interface 100 or network of interfaces 100 the interfaces 100 will signal the appropriate EFDs with power and/or digital commands. The term "digital commands" as used herein refers to low voltage digital bytes of data being communicated from a VR or AR computer and an interface 100, between interfaces 100, from an interface 100 and a EFD, or from a EFD and an interface 100. These digital commands are transferred over wired and wireless connections generally. EFDs that receive power and/or digital commands will behave in a physical way to provide an environmental stimuli to the user of the VR and/or AR system. For example a fan being used as an EFD would receive power from interface 100 and turn on to provide wind as a stimuli to a VR user.

As indicated above, wired EFDs may be signaled with digital commands and/or power. Wirelessly connected EFDs may only be signaled with digital commands. Wired and wirelessly connected EFDs may signal digital commands back to interface 100. For example if a fan was wired into interface 100 with a power socket connection as well as wirelessly connected over a bluetooth connection, then interface 100 may send power to turn on the fan and the fan may send back wind speed data over the Bluetooth connection. Interface 100 may adjust the power being sent to the fan to adjust the wind speed for a more appropriate wind speed based on the desired wind speed indicated by the virtual reality computer.

As explained above, interface 100 has a series of ports for the assignment of EFDs. Each port has the ability to signal with digital commands, receive digital data, or send power. Receptacles 114 are available with the ability to send power to a connected EFD. The nature of this power is typical or standard wall socket power available from regional utility companies. Examples of EFDs controlled from power sockets would be light bulbs, solenoid valves, electric motors, fans 202, and heating units 204 as depicted in FIG. 17. Universal serial bus ports (USB) 123, 125, 127, 129 are also available. USB ports 123, 125, 127, 129 send 5v level power constantly to an EFD and digital commands can also be sent. Digital data can also be received. Examples of EFDs controlled from a wired USB connection would be 5v embedded systems, low voltage robotics, buttons, or sensors. Digital Multiplex (DMX512) is a standard for digital communication networks and may be provided as wired ports on interface 100. DMX512 ports may have many EFDs connected in series—this is commonly referred to as a daisy chain. A series of connected devices to a DMX512 port is called a "DMX512 Universe." The DMX512 ports provide a constant low voltage power signal and digital commands can be sent, but no digital data can be received over this port. Examples of devices that may be controlled over a DMX512 port include stage lighting "movers," variable color LED light panels, stage pyrotechnical devices, stage laser lights or a humidity emitter 208 as depicted in FIG. 17. EFDs may also be assigned to interface 100 wirelessly over a Bluetooth connection using short range UHF radio waves. EFDs assigned to interface 100 over a wireless Bluetooth network are part of what is called a "personal area network." The interface's 100 Bluetooth ports (i.e., wi-fi adapters 126, 128) may provide digital commands to EFDs and/or receive digital data back from EFDs. Power is not provided to EFDs assigned via Bluetooth. Examples of EFDs connected over bluetooth would be wearable scent emitters 206 as depicted in FIG. 17 or wearable temperature controlled clothing, or a digital wind speed sensor attached to a fan.

Once an interface network configuration is complete and recorded in the interface network XML file an environment configuration process needs to be completed by the system builder to align all real word EFDs to the three dimensional space recorded in the VR or AR computer. This three dimensional space acts as a software layer for the real world space that will be utilized by the VR or AR system. VR and AR systems are all anchored to the real world by their tracking system that records the real world position and orientation of a system user's body and/or body parts. VR or AR systems usually, but not always, do real world tracking of a user's head, hands, or eye gaze direction. VR and AR computers have a configuration file that is referenced by their tracking systems that help align the computer graphics to the real world during AR or VR system operation. For the purposes of this patent application this will be referred to as the VR/AR configuration file.

In order for a system builder to indicate and record the real world position of EFDs the following process is completed. The system builder uses the device manager software on the VR or AR computer to initiate the EFD alignment process. The device manager software makes a copy to reference of the VR/AR configuration file and appends the interface network XML file with the three dimensional data description of the real world space recorded in the VR/AR configuration file. Next the system builder starts the EFD alignment process that is presented to the system builder as a VR or AR graphical user interface. It is important to note that at this point in the process the system builder is using the VR or AR equipment. In this process the real world is presented either as graphics on the VR or AR screen or as the real world seen through a video or see through lens technology available on the VR or AR system. The system builder next is presented with a menu of optional EFDs and uses the VR or AR system's input systems to pick and place virtual EFDs on to the real world position, orientation, and scale of each EFD installed in the system. The EFD type, position, orientation, scale, and parent or child interface 100 it is assigned to are all recorded in the device network XML file. For example.

Figure 18:
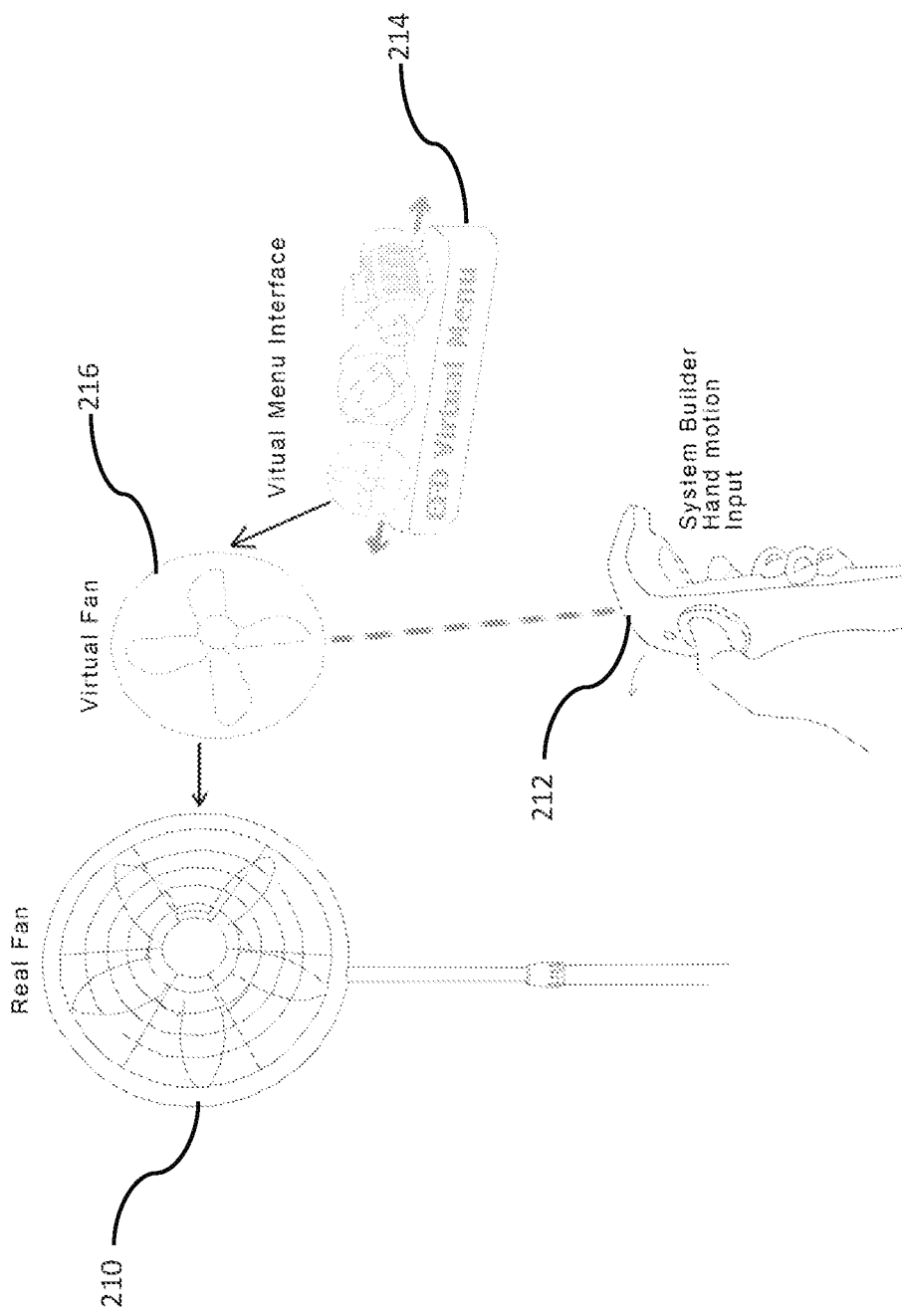
FIG. 18 is a perspective view of a configuration process for a system according to the present disclosure.

As depicted in FIG. 18, the system builder in a virtual reality headset sees a real world fan EFD 210 through a camera pass through image and uses the VR hand controller 212 to pick from a menu 214 which parent or child interface 100 that fan 210 is assigned too, next chooses a fan type EFD from menu 214 and drags a virtual fan 216 on top of the real fan 210. The system builder next rotates and scales the virtual fan 216 to match the real world fan 210. This placement information is recorded in the interface network XML file.

As should be understood from the foregoing, interfaces 100 may be used to control EFDs for use in an AR system. In AR systems users are able to see computer graphics aligned to the real world. Physical device interfaces 100 incorporated into an AR system provide the capability for touchless interaction of physical EFDs, visible EFD stimuli, and automated environmental feedback. A series of examples might better describe this use case. For example, an AR system is built where a lighting designer can control mechanical theater lighting EFDs through an AR headset and use hand gestures for touchless control. For example, an AR system video game that contains explosions and pyrotechnic devices may be connected as EFDs to simulate the explosions in the real world that add realism to the explosions in the computer graphics virtual world augmented in an AR headset. For example, in a collaborative AR and VR system for use in therapy an AR user doctor is able to expose the VR user patient to stimulating computer graphics with matching environmental feedback. The doctor can see the VR and EFD stimuli along with the patient and document responses toward improvement.

Certain aspects of the disclosure may be described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program determiners being executed by one or more processors (e.g., one or more microprocessor, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a machine-readable medium such as a storage medium or other storage(s). A code segment may represent a procedure, a function, a subprogram, a program, a routine, a subroutine, a determiner, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as programs, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or flash memory), or any other tangible medium capable of storing information.

In certain embodiments, the microprocessor board 130 includes one or more interpreters, determiners, or processors that functionally execute the operations of the board. The description herein including interpreters, determiners, or processors emphasizes the structural independence of certain aspects of the microprocessor board 130, and illustrates one grouping of operations and responsibilities of the board. Other groupings that execute similar overall operations are understood within the scope of the present application. Interpreters, determiners, and processors may be implemented in hardware and/or as computer instructions on a non-transient computer readable storage medium, and may be distributed across various hardware or computer based components.

Example and non-limiting implementation elements that functionally execute the operations of the microprocessor board 130 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Microprocessor board 130 may include a single processor, a distributed processor, an electronic equivalent of a processor, or any combination of the aforementioned elements, as well as software, electronic storage, fixed lookup tables and the like. Board 130 may include a digital or analog circuit.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." For example, the use of the term "frequency" is not intended to mean only one and only one frequency. Thus, in various embodiments and/or configurations, multiple fundamental oscillation frequencies from which reinforcing or unique information about the system and/or fuel may be obtained.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A physical device interface for a virtual reality system, comprising:
   a microprocessor board including a microprocessor, a plurality of control outputs, a first communication port and a second communication port;
   a plurality of receptacles configured to provide power to a corresponding first plurality of environmental feedback devices; and
   a power board coupled to the plurality of control outputs and the plurality of receptacles, the power board including a plurality of channels controlled by the plurality of control outputs to provide power to the plurality of receptacles;
   wherein the first communication port is configured to communicate with a computer for configuration of the physical device interface and the second communication port is configured for hierarchical interfacing with at least one other physical device interface.

2. The physical device interface of claim 1, wherein the first communication port is an Ethernet port.

3. The physical device interface of claim 1, wherein the second communication port is a USB port.

4. The physical device interface of claim 1, wherein the microprocessor is configured to automatically determine an IP address associated with the at least one other physical device interface.

5. The physical device interface of claim 4, wherein the microprocessor automatically determines the IP address by sending a request to all possible IP addresses connected to the physical device interface.

6. The physical device interface of claim 1, wherein the first plurality of environmental feedback devices includes at least one of a fan, a scent emitter and a heating unit.

7. The physical device interface of claim 1, further comprising a plurality of ports configured to provide digital commands to a corresponding second plurality of environmental feedback devices.

8. The physical device interface of claim 7, wherein the plurality of ports is configured to wirelessly communicate the digital commands to the corresponding second plurality of environmental feedback devices.

9. A system for controlling environmental feedback devices of a virtual or augmented reality system, comprising:
   a plurality of physical device interfaces including a parent interface communicatively connected to a plurality of child interfaces for hierarchical interfacing, each of the plurality of physical device interfaces including a microprocessor configured to control power flow to a first plurality of environmental feedback devices via a corresponding plurality of receptacles on each of the plurality of physical device interfaces and to provide digital commands to a second plurality of environmental feedback devices via a corresponding plurality of output ports on each of the plurality of physical device interfaces; and
   a computer coupled to the parent interface, the computer including software that when executed causes the computer to automatically identify IP addresses of the plurality of physical device interfaces.

10. The system of claim 9, wherein the parent interface includes an Ethernet port for coupling to the computer.

11. The system of claim 9, wherein the plurality of output ports include at least one USB port.

12. The system of claim 9, wherein the plurality of output ports provide communication connections between the plurality of child interfaces and the parent interface.

13. The system of claim 9, wherein the first plurality of environmental feedback devices include at least one of a fan, a scent emitter and a heating unit.

14. The system of claim 9, wherein the plurality of output ports include output ports that are configured to wirelessly communicate the digital commands to the second plurality of environmental feedback devices.

15. The system of claim 9, wherein each of the plurality of receptacles is configured to receive a standard electrical plug.

16. A method for controlling environmental feedback devices in a virtual or augmented reality system, comprising:
   providing a communication link between a computer and a parent physical device interface;
   providing communications links between the parent physical device interface and a plurality of child physical device interfaces for hierarchical interfacing;
   coupling a plurality of environmental feedback devices to the parent physical device interface and the plurality of child physical device interfaces;

sending digital commands to operate the plurality of environmental feedback devices from the computer to the parent physical device interface;

multicasting the digital commands from the parent physical device interface to the plurality of child physical device interfaces; and signaling the plurality of environmental feedback devices to operate by transferring the digital commands to the plurality of environmental feedback devices.

17. The method of claim 16, further comprising coupling a second plurality of environmental feedback devices to a corresponding plurality of power receptacles disposed on the parent physical device interface and the plurality of child physical device interfaces.

18. The method of claim 17, further comprising controlling operation of the second plurality of environmental feedback devices by controlling power flow to the corresponding plurality of power receptacles.

19. The method of claim 16, wherein the communication link between the computer and the parent physical device interface is an Ethernet port.

20. The method of claim 16, wherein the communication links between the parent physical device interface and the plurality of child physical device interfaces include at least one wired connection and at least one wireless connection.

* * * * *